US011847656B1

(12) United States Patent
Leavitt et al.

(10) Patent No.: US 11,847,656 B1
(45) Date of Patent: Dec. 19, 2023

(54) FRAUD PREVENTION TOOL

(71) Applicant: Wells Fargo Bank, N.A., San Francisco, CA (US)

(72) Inventors: Robin Leavitt, Charlotte, NC (US); Christine Skatchke, Cedarburg, WI (US); Chad Yarbrough, St. Louis, MO (US); Caroline S Cote, Tega Cay, SC (US); James Seeley, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/068,119

(22) Filed: Dec. 19, 2022

Related U.S. Application Data

(62) Division of application No. 16/929,754, filed on Jul. 15, 2020, now Pat. No. 11,531,988, which is a division of application No. 15/869,230, filed on Jan. 12, 2018, now Pat. No. 10,719,832.

(51) Int. Cl.
G06Q 20/40 (2012.01)
(52) U.S. Cl.
CPC ... *G06Q 20/4016* (2013.01); *G06Q 20/40145* (2013.01)
(58) Field of Classification Search
CPC .............. G06Q 20/4016; G06Q 20/40145
USPC ....................................... 705/35, 44
See application file for complete search history.

(56) References Cited

U.S. PATENT DOCUMENTS

| 6,937,702 | B1 | 8/2005 | Vacek et al. |
| 7,296,734 | B2 | 11/2007 | Pliha |
| 8,005,680 | B2 | 8/2011 | Kommer |
| 8,028,896 | B2 | 10/2011 | Carter |
| 8,095,112 | B2 | 1/2012 | Chow et al. |
| 8,458,090 | B1 | 6/2013 | Batra et al. |
| 8,532,987 | B2 | 9/2013 | Holzrichter |
| 8,590,018 | B2 | 11/2013 | Thavasi et al. |
| 8,666,841 | B1 | 3/2014 | Claridge et al. |
| 8,909,537 | B2 | 12/2014 | You |
| 8,955,145 | B2 | 2/2015 | Vernal et al. |
| 9,104,886 | B1 | 8/2015 | Dolbakian et al. |
| 9,189,697 | B1 | 11/2015 | Daniel |

(Continued)

FOREIGN PATENT DOCUMENTS

WO WO-2016176834 A1 11/2016

OTHER PUBLICATIONS

"U.S. Appl. No. 15/705,593, Final Office Action dated Dec. 26, 2019", 11 pgs.

(Continued)

*Primary Examiner* — William E Rankins
(74) *Attorney, Agent, or Firm* — SCHWEGMAN LUNDBERG WOESSNER, P.A.

(57) ABSTRACT

Various examples are directed to systems and methods for detecting fraud. A financial institution system may receive, from a transaction device, a transaction authorization request describing a transaction to be drawn on an account of a user. The financial institution system may also receive, from the user computing device, environmental data describing an environment of the user and determine that the environmental data indicates an anomalous condition. Based at least in part on the determining, the financial institution system may decline the transaction.

20 Claims, 11 Drawing Sheets

(56) References Cited

U.S. PATENT DOCUMENTS

| | | | |
|---|---|---|---|
| 9,208,753 | B2 | 12/2015 | Chan et al. |
| 9,286,453 | B2 | 3/2016 | Boss et al. |
| 9,300,676 | B2 | 3/2016 | Madhu et al. |
| 9,405,918 | B2 | 8/2016 | Freed et al. |
| 9,424,836 | B2 | 8/2016 | Lee et al. |
| 9,461,970 | B2 | 10/2016 | Biswas et al. |
| 9,479,512 | B2 | 10/2016 | Castro et al. |
| 9,513,615 | B2 | 12/2016 | Madonna et al. |
| 9,578,173 | B2 | 2/2017 | Sanghavi et al. |
| 9,607,620 | B2 | 3/2017 | Jones |
| 9,647,999 | B2 | 5/2017 | Grigg et al. |
| 9,680,983 | B1 | 6/2017 | Schuster et al. |
| 9,898,610 | B1 | 2/2018 | Hadsall |
| 10,043,069 | B1 | 8/2018 | Liu et al. |
| 10,248,804 | B2 | 4/2019 | Valacich et al. |
| 10,664,845 | B1* | 5/2020 | Lambert .............. G06Q 20/405 |
| 10,719,592 | B1 | 7/2020 | Nichols et al. |
| 10,719,832 | B1 | 7/2020 | Leavitt et al. |
| 11,017,115 | B1 | 5/2021 | Young et al. |
| 11,366,890 | B1 | 6/2022 | Nichols et al. |
| 11,531,988 | B1 | 12/2022 | Leavitt et al. |
| 2002/0078204 | A1 | 6/2002 | Newell et al. |
| 2003/0195859 | A1 | 10/2003 | Lawrence |
| 2004/0162987 | A1 | 8/2004 | Doyle et al. |
| 2006/0228003 | A1 | 10/2006 | Silverstein |
| 2006/0247919 | A1 | 11/2006 | Specht et al. |
| 2007/0071206 | A1 | 3/2007 | Gainsboro et al. |
| 2008/0082377 | A1 | 4/2008 | Kennis et al. |
| 2009/0307028 | A1 | 12/2009 | Eldon et al. |
| 2010/0053359 | A1 | 3/2010 | Mooradian et al. |
| 2010/0205667 | A1 | 8/2010 | Anderson et al. |
| 2010/0303211 | A1 | 12/2010 | Hartig et al. |
| 2011/0099602 | A1 | 4/2011 | Apparao et al. |
| 2013/0103943 | A1 | 4/2013 | Hirsch et al. |
| 2013/0159194 | A1 | 6/2013 | Habib |
| 2013/0196642 | A1 | 8/2013 | Endo et al. |
| 2013/0316735 | A1 | 11/2013 | Li et al. |
| 2014/0058910 | A1 | 2/2014 | Abeles |
| 2014/0157401 | A1 | 6/2014 | Alameh et al. |
| 2014/0164476 | A1 | 6/2014 | Thomson |
| 2014/0181715 | A1 | 6/2014 | Axelrod et al. |
| 2014/0214568 | A1 | 7/2014 | Argue et al. |
| 2014/0309999 | A1 | 10/2014 | Basson et al. |
| 2014/0344918 | A1 | 11/2014 | Choi et al. |
| 2015/0046161 | A1 | 2/2015 | Locker et al. |
| 2015/0046332 | A1 | 2/2015 | Adjaoute |
| 2015/0156171 | A1 | 6/2015 | Biswas et al. |
| 2015/0199523 | A1 | 7/2015 | Hamilton et al. |
| 2015/0269946 | A1* | 9/2015 | Jones ...................... G10L 17/22 704/273 |
| 2015/0340040 | A1 | 11/2015 | Mun et al. |
| 2016/0098992 | A1 | 4/2016 | Renard et al. |
| 2016/0118036 | A1 | 4/2016 | Cheatham et al. |
| 2016/0143570 | A1 | 5/2016 | Valacich et al. |
| 2016/0253998 | A1 | 9/2016 | Iyer et al. |
| 2016/0261532 | A1 | 9/2016 | Garbin et al. |
| 2016/0350553 | A1 | 12/2016 | Alameh et al. |
| 2016/0364895 | A1 | 12/2016 | Santossio et al. |
| 2017/0068550 | A1 | 3/2017 | Zeitlin |
| 2017/0092229 | A1 | 3/2017 | Greenebaum et al. |
| 2018/0032798 | A1* | 2/2018 | Setchell ........... G06Q 20/40145 |
| 2018/0285592 | A1 | 10/2018 | Sharifi et al. |
| 2019/0014404 | A1 | 1/2019 | Olsson |
| 2019/0057687 | A1 | 2/2019 | Yang et al. |
| 2019/0130490 | A1 | 5/2019 | Durkee et al. |
| 2019/0149955 | A1 | 5/2019 | Rusu et al. |

OTHER PUBLICATIONS

"U.S. Appl. No. 15/705,593, Non Final Office Action dated Jul. 25, 2019", 11 pgs.

"U.S. Appl. No. 15/705,593, Notice of Allowance dated Mar. 17, 2020", 5 pgs.

"U.S. Appl. No. 15/705,593, Response filed Feb. 26, 2020 to Final Office Action dated Dec. 26, 2019", 13 pgs.

"U.S. Appl. No. 15/705,593, Response filed Oct. 25, 2019 to Non-Final Office Action dated Jul. 25, 2019", 12 pgs.

"U.S. Appl. No. 15/797,840, Advisory Action dated Oct. 24, 2019", 3 pgs.

"U.S. Appl. No. 15/797,840, Final Office Action dated May 21, 2020", 17 pgs.

"U.S. Appl. No. 15/797,840, Final Office Action dated Aug. 1, 2019", 15 pgs.

"U.S. Appl. No. 15/797,840, Non Final Office Action dated Jan. 30, 2020", 16 pgs.

"U.S. Appl. No. 15/797,840, Non Final Office Action dated Feb. 20, 2019", 16 pgs.

"U.S. Appl. No. 15/797,840, Non Final Office Action dated Aug. 27, 2020", 19 pgs.

"U.S. Appl. No. 15/797,840, Notice of Allowance dated Jan. 25, 2021", 10 pgs.

"U.S. Appl. No. 15/797,840, Response filed Apr. 30, 2020 to Non Final Office Action dated Jan. 30, 2020", 9 pgs.

"U.S. Appl. No. 15/797,840, Response filed Jul. 15, 2020 to Final Office Action dated May 21, 2020", 9 pgs.

"U.S. Appl. No. 15/797,840, Response filed Jul. 18, 2019 to Non-Final Office Action dated Feb. 20, 2019", 16 pgs.

"U.S. Appl. No. 15/797,840, Response filed Oct. 1, 2019 to Final Office Action dated Aug. 1, 2019", 10 pgs.

"U.S. Appl. No. 15/797,840, Response filed Nov. 25, 2020 to Non Final Office Action dated Aug. 27, 2020", 9 pgs.

"U.S. Appl. No. 15/869,230, Notice of Allowance dated Mar. 13, 2020", 8 pgs.

"U.S. Appl. No. 15/869,230, Response filed Feb. 19, 2020 to Restriction Requirement dated Dec. 19, 2019", 6 pgs.

"U.S. Appl. No. 15/869,230, Restriction Requirement dated Dec. 19, 2019", 7 pgs.

"U.S. Appl. No. 16/929,754, Examiner Interview Summary dated Dec. 29, 2021", 2 pgs.

"U.S. Appl. No. 16/929,754, Non Final Office Action dated Jan. 25, 2022", 9 pgs.

"U.S. Appl. No. 16/929,754, Non Final Office Action dated Oct. 4, 2021", 7 pgs.

"U.S. Appl. No. 16/929,754, Notice of Allowance dated May 17, 2022", 11 pgs.

"U.S. Appl. No. 16/929,754, Notice of Allowance dated Aug. 3, 2022".

"U.S. Appl. No. 16/929,754, Response filed Apr. 25, 2022 to Non Final Office Action dated Jan. 25, 2022", 10 pgs.

"U.S. Appl. No. 16/929,754, Response filed Dec. 8, 2021 to Non Final Office Action dated Oct. 4, 2021", 10 pgs.

"U.S. Appl. No. 16/929,754, Supplemental Amendment filed Jun. 29, 2022", 8 pgs.

"U.S. Appl. No. 16/930,004, Non Final Office Action dated Oct. 28, 2021", 12 pgs.

"U.S. Appl. No. 16/930,004, Notice of Allowance dated Feb. 23, 2022", 14 pgs.

"U.S. Appl. No. 16/930,004, Response filed Dec. 23, 2021 to Non Final Office Action dated Oct. 28, 2021", 10 pgs.

Fawcett, Tom, et al., "Adaptive Fraud Detection", NYNEX Science and Technology, (Jul. 11, 1997), 291-316.

Kitten, Tracy, "Voice Biometrics as a Fraud Fighter", (May 22, 2012), 6 pgs.

Litan, Avivah, "Preventing Fraud in the Call Center with Phone Printing and Voice Biometrics", (Jun. 18, 2014), 4 pgs.

Nan-Wei, et al., "Dynamic Privacy Management in Pervasive Sensor Networks", Ambient Intelligence. Proceedings First International Joint Conference, AmI, (2010), 96-106.

Ruiz-Agundez, Igor, et al., "Fraud Detection for Voice over IP Services on Next-Generation Networks", https://www.deusto.es, (2010), 14 pgs.

Schaub, et al., "Towards context adaptive privacy decisions in ubiquitous computing", 2012 IEEE International Conference on Pervasive Computing and Communications Workshops (PerCom Workshops), (2012), 407-410.

Shahani, Aarti, "Why Phone Fraud Starts with a Silent Call", (Aug. 24, 2015), 6 pgs.

(56) References Cited

OTHER PUBLICATIONS

"U.S. Appl. No. 17/806,389, Non Final Office Action dated Apr. 27, 2023", 12 pgs.

"U.S. Appl. No. 17/806,389, Response filed Jul. 25, 2023 to Non Final Office Action dated Apr. 27, 2023", 11 pgs.

U.S. Appl. No. 15/705,593, U.S. Pat. No. 10,719,592, filed Sep. 15, 2017, Input/Output Privacy Tool.

U.S. Appl. No. 16/930,004, U.S. Pat. No. 11,366,890, filed Jul. 15, 2020, Input/Output Privacy Tool.

U.S. Appl. No. 17/806,389, filed Jul. 10, 2022, Input/Output Privacy Tool.

U.S. Appl. No. 15/797,840, U.S. Pat. No. 11,017,115, filed Oct. 30, 2017, Privacy Controls for Virtual Assistants.

U.S. Appl. No. 15/869,230, U.S. Pat. No. 10,719,832, filed Jan. 12, 2018, Fraud Prevention Tool.

U.S. Appl. No. 16/929,754, U.S. Pat. No. 11,531,988, filed Jul. 15, 2020, Fraud Prevention Tool.

\* cited by examiner ent for a fraud prevention tool.
FRAUD PREVENTION TOOL

CROSS-REFERENCE TO RELATED APPLICATION

This application is a divisional of U.S. patent application Ser. No. 16/929,754, filed Jul. 15, 2020, now issued as U.S. Pat. No. 11,531,988, which is a divisional of U.S. patent application Ser. No. 15/869,230, filed Jan. 12, 2018, now issued as U.S. Pat. No. 10,719,832, each of which are incorporated by reference herein in their entirety.

TECHNICAL FIELD

Embodiments described herein generally relate to computerized systems and methods for fraud prevention.

BACKGROUND

Customers of financial institutions are sometimes victims of attempted fraud where a third party tricks or coerces a customer into giving up money. Retiree and other senior customers are often especially vulnerable to fraudulent schemes.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
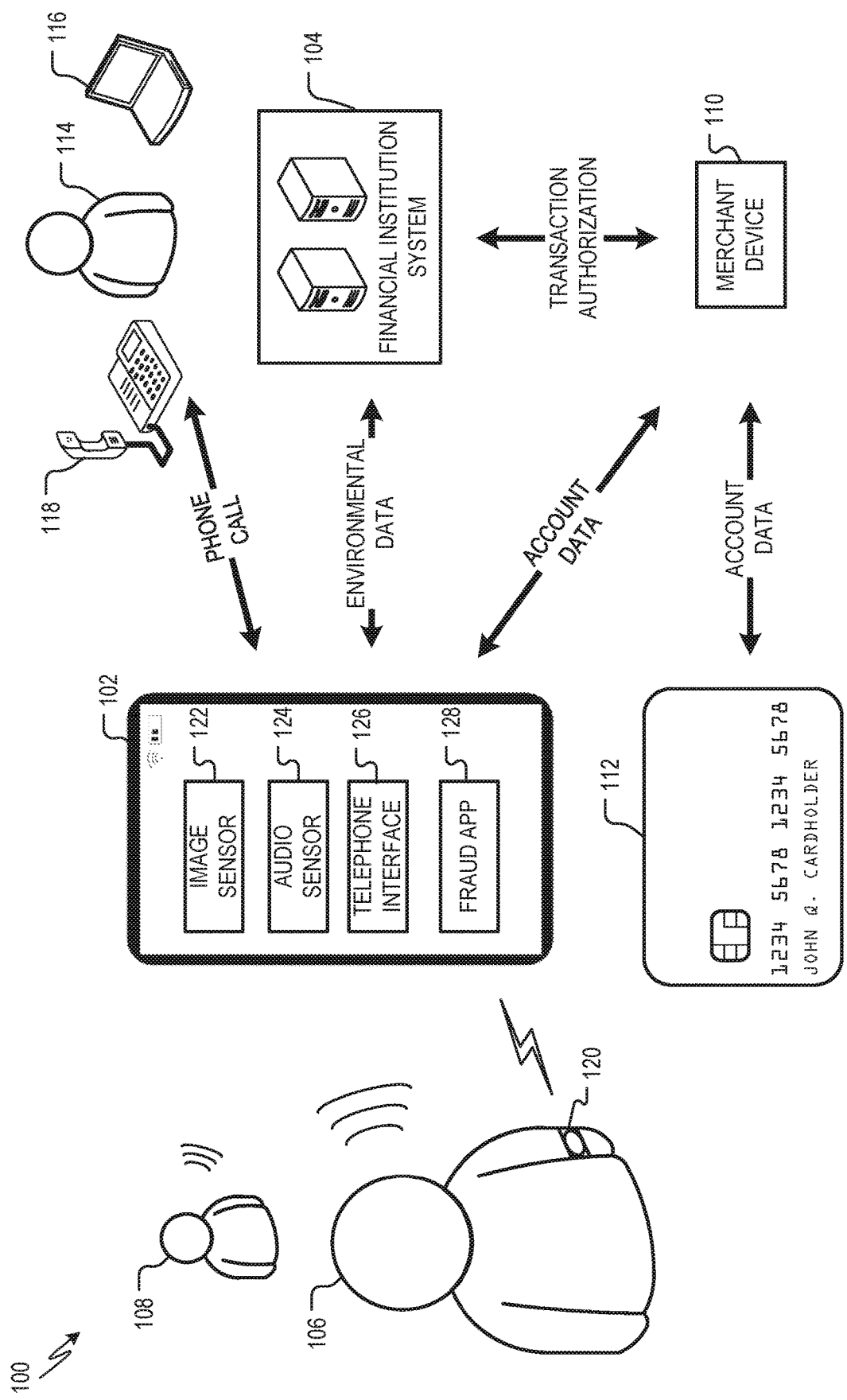
FIG. 1 is a diagram showing one example of an environment for a fraud prevention tool.

Various examples are directed to systems and methods for detecting and preventing fraud to customers of a financial institution.

Many schemes to defraud financial institution customers involve coercing or tricking the customers into executing transactions that draw on the customer's account. The fraudster then takes the proceeds of the transaction. For example, the transaction may be a cash withdrawal, a gift card purchase, or a transfer to an account that the fraudster later accesses, Fraudsters are known to use various techniques to trick or coerce the customer into executing transactions on their behalf. For example, a fraudster may pose as a grandchild or other family member of the customer. After convincing the customer that his or her family member is in some trouble, the fraudster accepts money from the customer, ostensibly to assist the family member. In another example scheme, the fraudster poses as a debt collector and attempts to collect a debt purportedly owed by the customer or a loved one. In other examples schemes, the fraudster is a family member or someone whom the customer trusts.

When a customer succumbs to a fraud and executes a transaction under coercion or false pretenses, there are often environmental factors indicating that something is amiss. For example, the customer is often agitated, e.g., out of concern for a family member who is the subject of the scam, concern about the unexpected expense, fear that he or she is being defrauded, etc. Also, in some examples, the fraudster is physically present when the transaction is made and may be captured by images or audio recordings.

The examples described herein are directed to computer-implemented systems and methods that are for detecting that a transaction may be coerced or under false pretenses by capturing environmental data received from sensors for sensing the customer's environment. For example, a user may be a customer of a financial institution. For example, the user may have one or more accounts with the financial institution such as, for example, demand deposit accounts, savings accounts, credit accounts, etc. The user may utilize a user computing device comprising one or more sensors such as, for example, a microphone or other audio sensor, a camera or other image sensor, etc. In some examples, the user computing device also includes or is in communication with biometric sensors for sensing biometric data about the customer, such as, for example, the customer's heart rate, the customer's temperature, etc. When the customer requests a transaction, the user computing device captures environmental data describing the user's environment. The user computing device analyzes the environmental data and/or sends it to a financial institution system. If the environmental data indicates that the user is requesting the transaction under duress or otherwise indicates a fraud, the financial institution system may implement a remedial action such as, for example, blocking the transaction.

FIG. 1 is a diagram showing one example of an environment 100 for a fraud prevention tool. The environment 100 includes a user computing device 102 and a financial institution system 104. The financial institution system 104 may be or include a server or other suitable computing device. The environment 100 also includes things and components that interact with the user computing device 102 and financial institution system 104 including, for example, a user 106, a user payment card 112, a financial institution operator 114 and operator devices 116, 118, and a merchant device 110.

The user computing device 102 is used by a user 106 and is or includes any suitable type of computing device including, for example, a mobile computing device such as a mobile telephone, a laptop computer, a desktop computer, a tablet computer, etc. The user computing device 102 may include various sensors 122, 124 for capturing environmental data describing the environment 100. An image sensor 122 captures images of the user 106 and/or another person 108 or things around the user 106. The image sensor 122 may be or include a camera. An audio sensor 124 captures audio data describing sounds around the user 106 including, for example, the voice of the user 106 and/or the voice of another person 108 around the user 106.

In some examples, the user computing device 102 is in communication with a wearable device 120 of the user 106. The wearable device 120 may include additional sensors for generating environmental data describing biometrics of the user 106 such as, for example, the user's heart rate, temperature, skin conductivity, etc. The wearable device 120 may be in communication with the user computing device 102 via any suitable communication medium including, for example, Wi-Fi, a short range communication medium such as Bluetooth®, Bluetooth LE, Near Field Communication (NEC), etc. In some examples, the user computing device 102 is omitted and the wearable device 120 performs the functions described for the user computing device 102.

The user computing device 102 optionally includes a telephone interface 126 for placing calls over a telephone network, such as, for example, a mobile or cellular telephone network, a wired telephone network, etc. For example, the telephone interface 126 may include a transceiver for communicating with a mobile telephone network. The user computing device 102 may also execute a fraud application 128. The fraud application 128 captures environmental data from the sensors 122, 124 and/or from the wearable device 120 in addition to other functionality, for example, as described herein.

The merchant device 110 may communicate with the user computing device 102 and/or the payment card 112 to initiating a transaction drawing on an account of the user 106. In some examples, the merchant device 110 includes a Point of Sale (POS) device. For example, the merchant device 110 may be positioned at a location where the user 106 makes a purchase. The merchant device 110 may receive information for requesting the transaction, for example, from the payment card 112 or the user computing device 102. For example, the merchant device 110 may include a reader for reading Europay Mastercard Visa (EMV) chips, magnetic strips, or other storage or communication devices at the payment card 112. For example, the user 106 may provide the payment card 112 to the merchant device 110 to initiate a transaction. The merchant device 110 reads account data describing the user's account from the payment card 112 and requests authorization for the transaction from the financial institution system 104.

In some examples, the user 106 initiates the transaction from the user computing device 102. The user computing device 102 (e.g., a mobile wallet application executed at the user computing device 102) may provide the account data to the merchant device 110, which may initiate the transaction by providing the transaction authorization request to the financial institution system 104. In some examples, the merchant device 110 is or includes a merchant web server. For example, the user 106 may contact the merchant device 110 over a network, such as the Internet, using a web browser or other suitable application executing at the user computing device 102. The user 106 may provide account data that is used by the merchant device 110 to request authorization for the transaction from the financial institution system 104.

The financial institution system 104 and/or fraud application 128 may be configured to detect and remediate potentially fraudulent transactions. Consider an example in which the user 106 initiates a transaction with the merchant device 110. The merchant device 110 receives account data, e.g., as described herein, and uses the account data to request authorization for the transaction from the financial institution system 104. Before the transaction is approved by the financial institution system 104, the financial institution system 104 may receive environmental data captured by the user computing device 102 and/or wearable device 120. In some examples, the user computing device 102 and/or wearable device 120 automatically captures environmental data and provides the same to the financial institution system 104 at or near the time that the transaction is requested. In some examples, the financial institution system 104 sends, to the user computing device 102, a request for environmental data at or about the time that it determines whether to approve a requested transaction.

The financial institution system 104 may evaluate the environmental data to detect an anomalous condition. An anomalous condition may occur, for example, if the environmental data indicates that the environmental circumstances of the user 106 deviate from those of normal transactions. For example, the financial institution system 104 may detect an anomalous condition if the user's biometric data deviates from a personal or general baseline. For example, if the user's heart rate, temperature, etc., is outside of a user-specific range and/or a general range, the financial institution system 104 may detect an anomalous condition.

In some examples, the financial institution system 104 detects an anomalous condition if image data captured by the image sensor 122 indicates that the user 106 is with another person 108. For example, the financial institution system 104 or other suitable system may perform facial recognition or other suitable processing to determine whether the other person 108 is expected to be near the user 106 during transactions. For example, the financial institution system 104 may access a list of trusted persons for the user 106. If the other person 108 is not on the list, an anomalous condition may be detected. In some examples, the financial institution detects an anomalous condition if audio data captured by the audio sensor 124 indicates that the other person 108 is present. For example, the audio data may indicate a voice of the person 108. The financial institution system 104 or other suitable system may detect the voice of the other person 108 and determine if the other person 108 is expected to be near the user 106 during transactions. If not, the financial institution system 104 may detect an anomalous condition.

In some examples, the user computing device 102 (e.g., the fraud application 128) may detect the presence or absence of an anomalous condition, for example, based on captured environmental data. The user computing device 102 may provide an indication of an anomalous condition (if present) to the financial institution system 104.

If an anomalous condition is detected, the user computing device 102 and/or financial institution system 104 may take a remedial action. For example, the financial institution system 104 may decline to authorize the transaction. In some examples, the financial institution system 104 may take additional steps before approving the transaction such as, for example, contacting a financial advisor, caretaker, or other trusted person associated with the user 106 to verify that the transaction is legitimate and not part of a fraud (e.g., against the user 106). In some examples, the user computing device 102 is programmed to take these or other remedial actions (in addition to or instead of remedial actions taken by the financial institution system 104).

The environment 100 also illustrates an example situation where the user 106 contacts the operator 114 by telephone to initiate a transaction. The operator 114 may be anyone who speaks with the user 106 by phone, for example, regarding a transaction. For example, the operator 114 may be a financial advisor or other person who can initiate a transaction on behalf of the user 106. The operator 114 may utilize one or more operator devices 118, 116, These may include desktop computers, laptop computers, telephones, etc.

The user 106 may call the operator 114 to instruct the operator 114 to initiate a transaction, for example, by liquidating securities, withdrawing from an account, etc. In some examples, the user computing device 102 (e.g., the fraud application 128 thereof) is configured to detect when the user 106 uses the telephone interface 126 to place a call to the operator 114. The user computing device 102 may respond to the call by sending environmental data and/or an indication of a detected anomalous condition to the financial institution system 104. The financial institution system 104 optionally determines if an anomalous condition exists and, if so, takes a remedial action. The remedial action may include blocking the requested transaction. The remedial action may also include providing to the operator 114 an indication of the anomalous condition. This may prompt the operator 114 to gather additional information about whether the requested transaction is potentially fraudulent, for example, by asking additional questions of the user 106 over the telephone.

Figure 2:
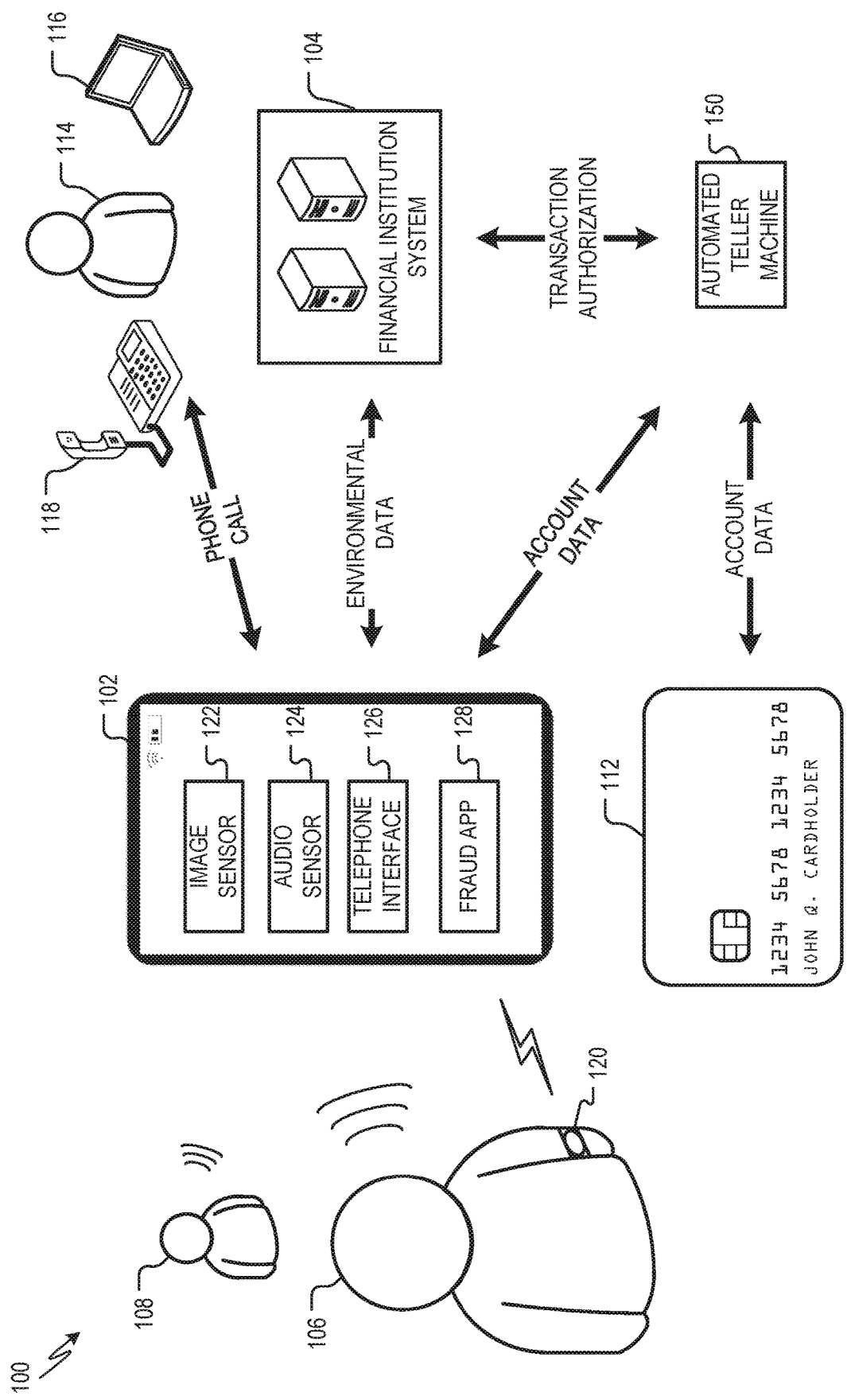
FIG. 2 shows another example of the environment of FIG. 1 with an automated teller machine.

FIG. 2 shows another example of the environment 100 with an automated teller machine 150 in lieu of the merchant device 110 (FIG. 1). For example, FIG. 2 shows an example where the user computing device 102 and financial institution system 104 are used to detect and remediate potentially fraudulent transactions at the automated teller machine 150. For example, the user 106 may initiate a transaction (e.g., to withdraw cash) from the automated teller machine 150. In this sense, both the automated teller machine 150 and the merchant device 110 are transaction devices. The user computing device 102 and/or wearable device 120 may capture environmental data, as described herein. The user computing device 102 and/or the financial institution system 104 may determine if an anomalous condition is detected and, if so, take a remedial action, as described herein.

Figure 3:
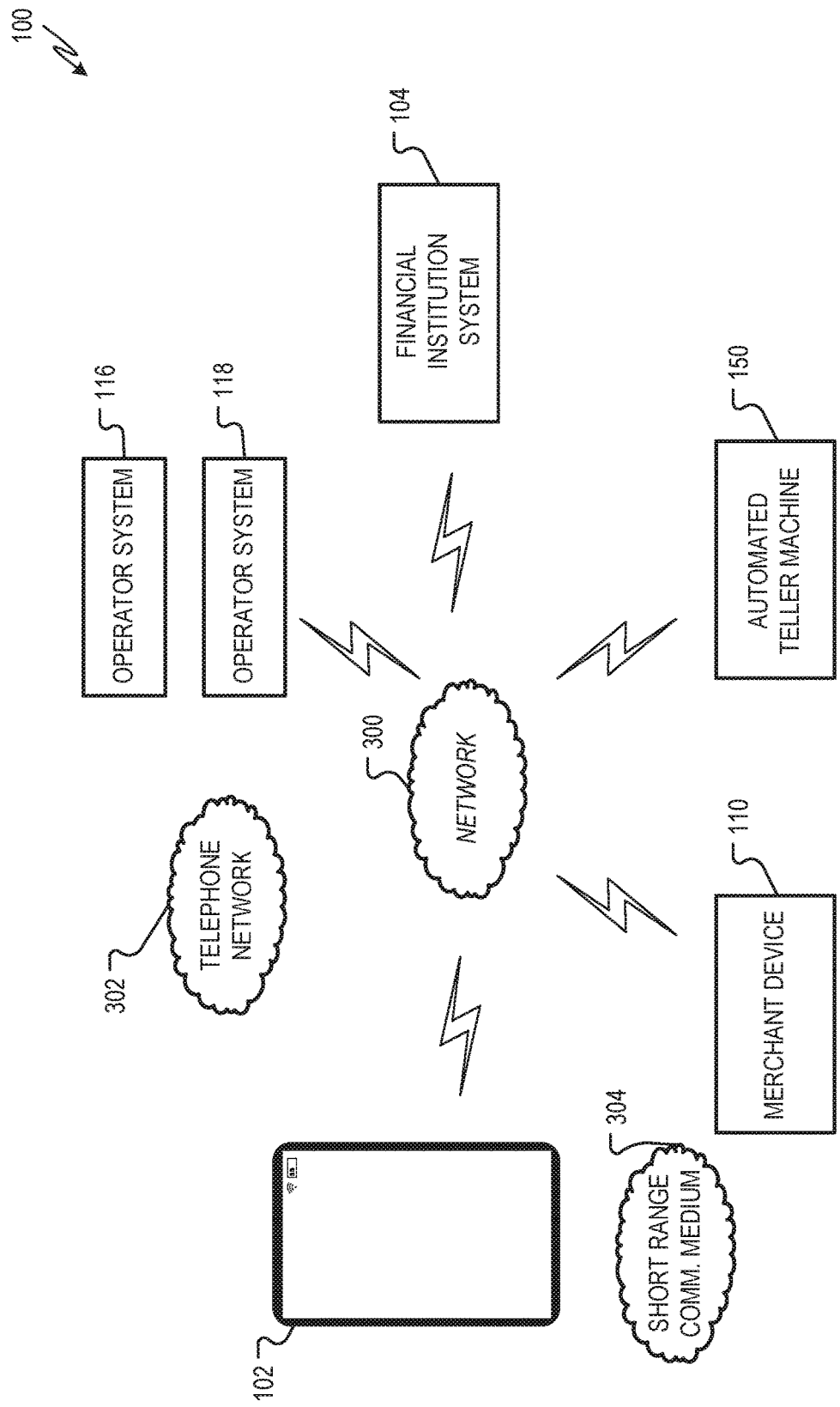
FIG. 3 is a diagram showing another example of the environment of FIG. 1 including additional details.

FIG. 3 is a diagram showing another example of the environment 100 including additional details. In the example of FIG. 3, the user computing device 102, the operator devices 116, 118, the financial institution system 104, the automated teller machine 150, and the merchant device 110 are in communication with one another via a network 300. The network 300 may be or comprise any suitable network element operated according to any suitable network protocol. For example, one or more portions of the network 300 may be an ad hoc network, an intranet, an extranet, a virtual private network (VPN), a local-area network (LAN), a wireless LAN (WLAN), a wide-area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

FIG. 3 also shows that the user computing device 102 and operator devices 116, 118 may also be in communication with one another via a telephone network 302, which may be or include any suitable wired, wireless, and/or mixed telephone network. Also, as described herein, the user computing device 102 maybe in communication with the merchant device 110 via a short range communication medium 304, as described here.

Figure 4:
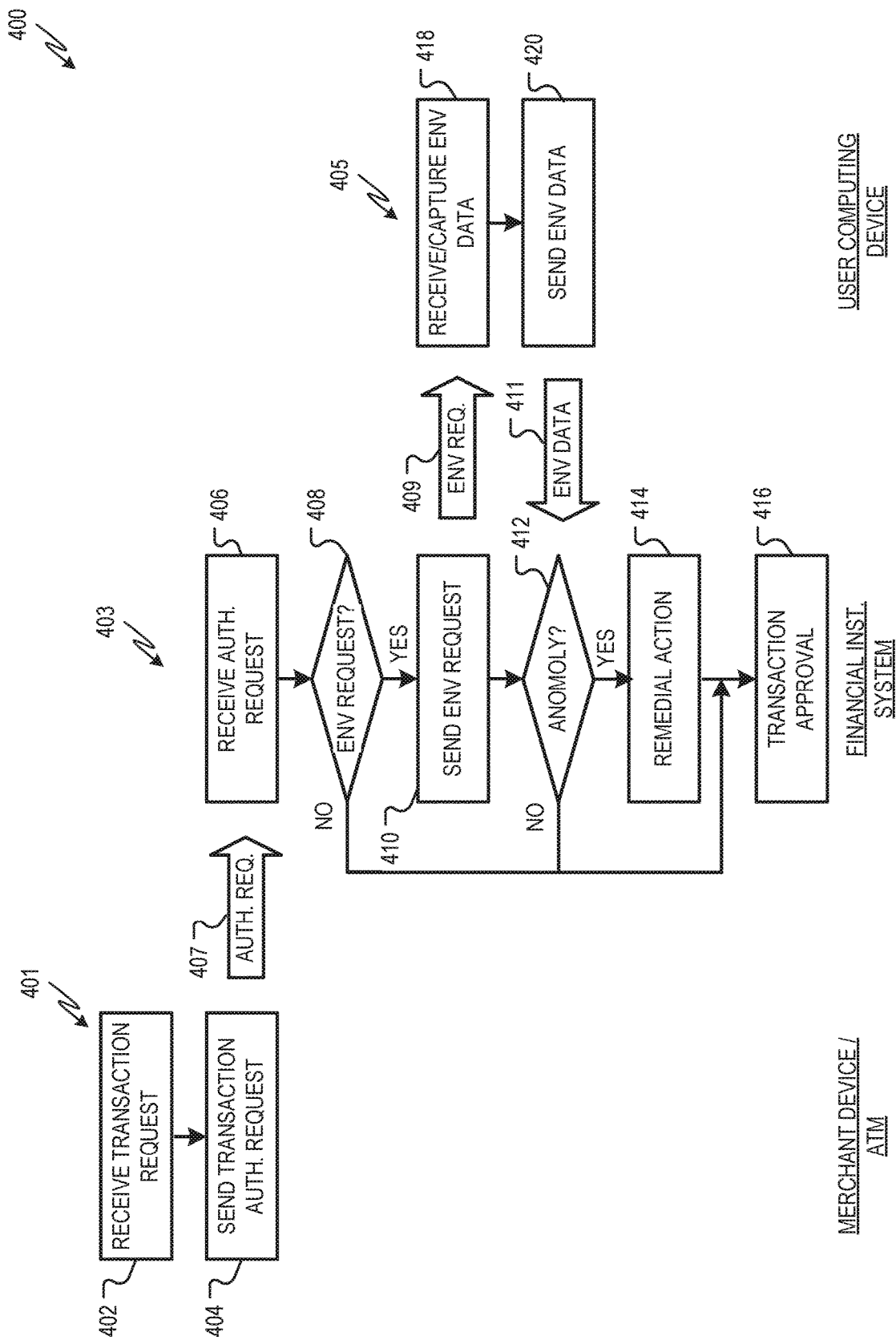
FIG. 4 is a flowchart showing one example of a process flow that may be executed in the environment of FIG. 1 to implement a fraud prevention tool.

FIG. 4 is a flowchart showing one example of a process flow 400 that may be executed in the environment 100 to implement a fraud prevention tool. The process flow 400 includes three columns 401, 403, 405. Column 401 includes operations that may be executed by the merchant device 110 and/or by the automated teller machine 150. Column 403 includes operations that may be executed by the financial institution system 104, Column 405 includes operations that may be executed by the user computing device 102.

At operation 402, the merchant device 110 may receive a transaction request including account data describing an account on which the transaction is to be drawn. The transaction request may originate from the user 106. For example, the user 106 may provide the payment card 112 to the merchant device 110. In some examples, the user computing device 102 provides the account data to the merchant device 110, for example, via the Internet and/or a short range communication medium, as described herein. At operation 404, the merchant device 110 sends a transaction authorization request 407 to the financial institution system 104.

The financial institution system 104 receives the authorization request at operation 406. At operation 408, the financial institution system 104 determines whether to request environmental data at operation 408. In some examples, the financial institution system 104 requests environmental data for all transactions (e.g., or all transactions for which such data is available). In some examples, the financial institution system 104 requests environmental data for all transactions from a particular customer (e.g., the user 106). For example, the financial institution system 104 may access a user profile describing the user 106, If the user profile indicates that transactions for the user 106 are to be evaluated with environmental data, then a request for environmental data may be made at operation 410.

In some examples, the financial institution system 104 requests environmental data when the transaction is inconsistent with historical transaction data. For example, the financial institution system 104 may compare the transaction to other transactions made by the user 106, other transactions made by customers similar to the user 106, etc. If the transaction deviates from transactions described by the historical transaction data, the financial institution system 104 requests environmental data. If the financial institution system 104 determines not to request environmental data, it may proceed with transaction approval at operation 416, as described herein.

If the financial institution system 104 determines to request environmental data, it may send a request 409 for environmental data to the user computing device 102. In some examples, the financial institution system 104 may look up a Universal Resource Locator (URL) or other address for a user computing device associated with the user 106 to determine where the request 409 is to be sent. For example, the financial institution system 104 may access metadata associated with the user 106 and/or an account that the transaction may be drawn on. The metadata may indicate an address for the user computing device 102 associated with the user 106.

The user computing device 102 may receive the request 409 and, at operation 418, may receive and/or capture environmental data. For example, the user computing device 102 may capture environmental data utilizing one or more sensors 122, 124 and/or may capture environmental data from another device, such as the wearable device 120. At operation 420, the user computing device 102 may send environmental data 411 to the financial institution system 104. The financial institution system 104 may receive the environmental data 411 and, at operation 412, may determine whether an anomalous condition is detected. If not, the financial institution system 104 may proceed with transaction approval at operation 416.

If an anomalous condition is detected, the financial institution system 104 may, at operation 414, take a remedial action. Any suitable remedial action may be taken including, for example, declining to authorize the transaction, requesting verification of the transaction from a caretaker or other trusted person of the user 106, etc. Provided that the remedial action does not terminate consideration of the transaction (not shown for clarity), the financial institution system 104 may proceed to transaction approval at operation 416. Transaction approval may include sending an approval message to the merchant device 110. In some examples, transaction approval at operation 416 may include other actions for considering and approving the transaction including, for example, determining if the account has sufficient funds or credit, etc.

In some examples, the operations 402, 404 performed by the merchant device 110 may be performed instead by the automated teller machine 150. For example, the user 106 may attempt a transaction to withdraw cash from one or more accounts at the automated teller machine 150. The financial institution system 104 and user computing device 102 may perform operations as described in columns 403 and 405 to detect potential fraud in the attempted transaction.

Figure 5:
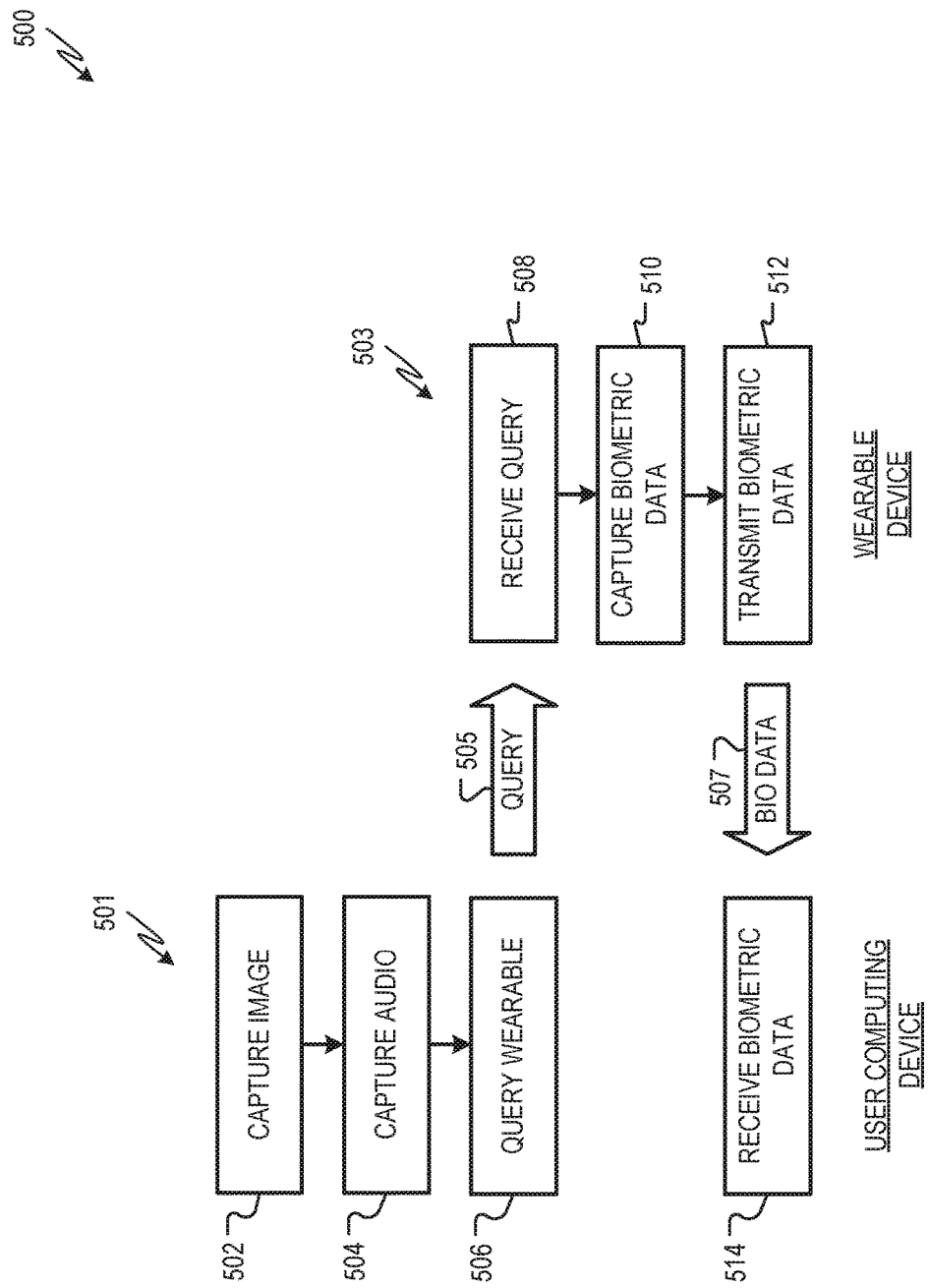
FIG. 5 is a flowchart showing one example of a process flow that may be executed by the user computing device and the wearable device of FIG. 1 to capture environmental data.

FIG. 5 is a flowchart showing one example of a process flow 500 that may be executed by the user computing device 102 and the wearable device 120 to capture environmental data. For example, the process flow 500 may be executed in response to a request for environmental data from the financial institution system 104. The process flow 500 includes columns 501 and 503. Column 501 includes operations that may be executed by the user computing device 102. Column 503 includes operations that may be executed by the wearable device 120.

In some examples, the process flow 500 may be executed in response to an indication that the user 106 has initiated a transaction. At operation 502, the user computing device 102 may capture an image, for example, with the image sensor 122. The image may depict people and/or items in the field-of-view of the image sensor 122. For example, the image may depict the user 106 and/or the other person 108. In some examples, multiple images may be taken. For example, the user computing device 102 may continue to take images while other operations of the process flow 500 are executed.

At operation 504, the user computing device 102 may capture audio data, for example, with the audio sensor 124. The audio data may indicate sounds that are present around the user computing device 102 such as, for example, voices of the user 106 and (if present) the other person 108. In some examples, the audio sensor 124 begins and/or continues to capture audio data while other operations of the process flow 500 are executed.

At operation 506, the user computing device 102 may send a query 505 to the wearable device 120. The wearable device 120 receives the query 505 at operation 508. In response to the query 505, the wearable device 120 may capture biometric data from the user 106 at operation 510. The biometric data may include, for example, the user's pulse, temperature, skin conductivity, etc. At operation 512, the wearable device 120 may send captured biometric data 507 to the user computing device 102, which may receive the biometric data 507 at operation 514. The user computing device 102 may utilize the environmental data to determine if an anomalous condition is detected and/or pass the environmental data to another system, such as the financial institution system 104, to determine if an anomalous condition is detected.

Figure 6:
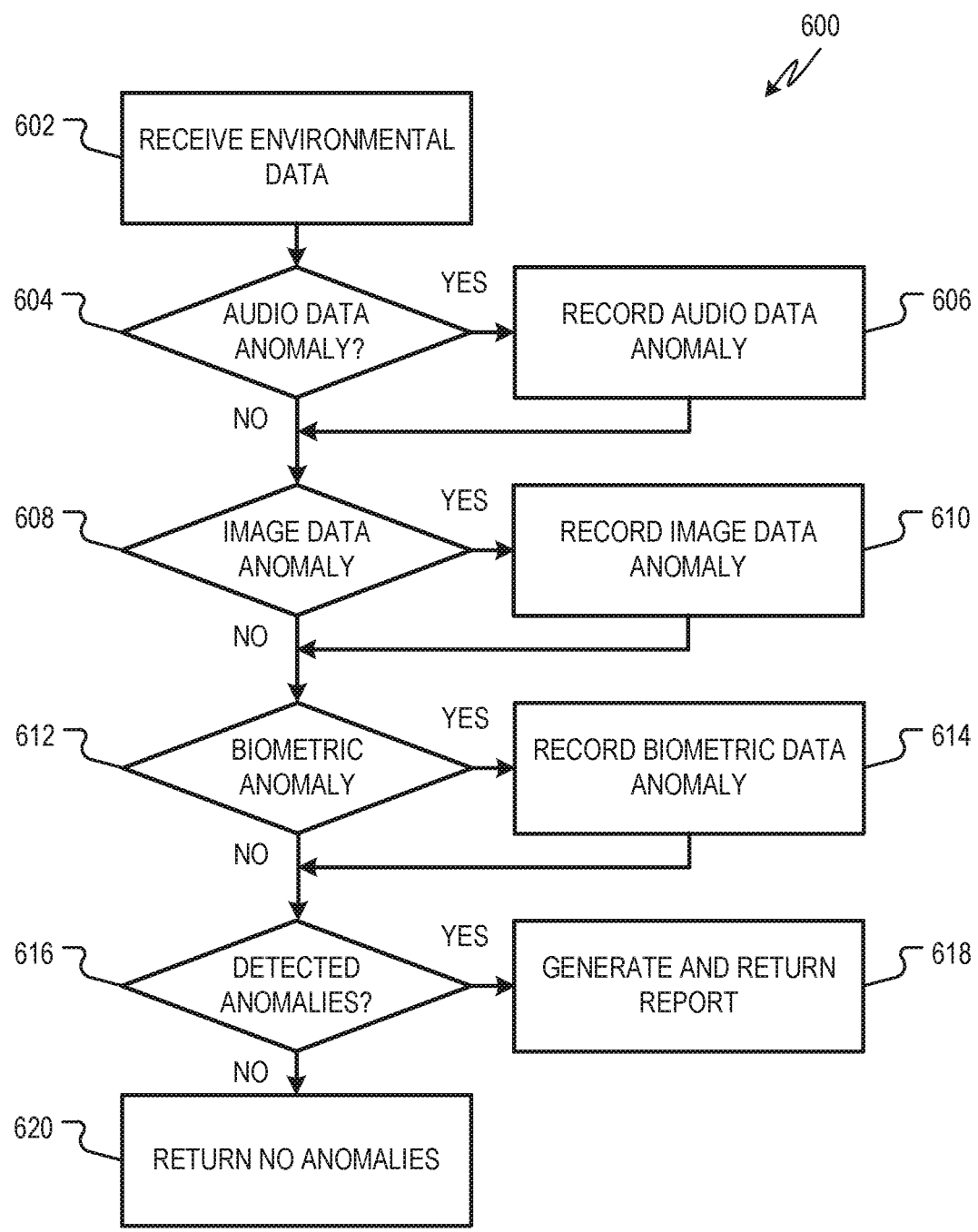
FIG. 6 is a flowchart showing one example of a process flow that may be executed by the financial institution system and/or the user computing device of FIG. 1 to detect an anomalous condition.

FIG. 6 is a flowchart showing one example of a process flow 600 that may be executed by the financial institution system 104 (and/or by the user computing device 102) to detect an anomalous condition. The process flow 600 is described as being executed by the financial institution system 104; however, in various examples, the process flow 600 is executed by the user computing device 102.

At operation 602, the financial institution system 104 receives environmental data. At operation 604, the financial institution system 104 determines if the environmental data includes an audio data anomaly. An audio data anomaly may occur if the audio data indicates a potential fraud. For example, audio data may indicate a potential fraud if the voices detected are not part of a set of trusted voices for the user 106. In some examples, audio data indicates a potential fraud if certain key words or phrases are present. In some examples, the financial institution system 104 may apply one or more voice recognition algorithms to identify words and/or voices in the audio data. If an audio anomaly is detected at operation 604, the financial institution system 104 may record an indication of the audio data anomaly, e.g., to a data storage device, at operation 606, and proceed to operation 608. If no audio data anomaly is detected at operation 604, the financial institution system 104 may proceed to operation 608. (Operations 604 and 606 may be skipped, for example, if the environmental data does not include audio data.)

At operation 608, the financial institution system 104 may determine if the environmental data indicates an image data anomaly. An image data anomaly may be present if image data indicates a potential fraud. For example, image data may indicate a potential fraud if the user 106 does not appear in one or more images, if an entrusted other person 108 appears in one or more images, etc. The financial institution system 104 may utilize any suitable facial recognition or other suitable algorithms to identify faces or other features of the user 106 and/or other people 108 in the image data. If an image data anomaly is detected at operation 608, the financial institution system 104 may record an indication of the image data anomaly at operation 610. (Operations 608 and 610 may be skipped, for example, if the environmental data does not include image data.)

If image data anomaly is detected, and/or after operation 610, the financial institution system 104 may determine if the environmental data indicates a biosensor anomaly at operation 612. A biosensor anomaly may be present if a biometric of the user 106 is outside of a range expected in general and/or particularly for the user 106. For example, the financial institution system 104 may compare the user's biometrics (e.g., heart rate, temperature, skin impedance, etc.) to baseline ranges, for the user 106 and/or for users in general. A biometric anomaly may occur if one or more biometrics are outside of the personal and/or general baseline ranges. If a biometric anomaly is detected at operation 612, the financial institution system 104 records an indication of the biometric anomaly at operation 614. (Operations 612 and 614 may be omitted if the environmental data does not include biometric data.)

If no biometric anomaly is detected and/or after operation 614, the financial institution system 104 may, at operation 616, determine if any anomalies were detected, for example, by examining the records of anomalies (optionally) written at operations 606, 610, and 614. If no anomalies were detected, the process flow 600 may return no anomalies at operation 620, If one or more anomalies were detected, the financial institution system 104 may generate and return a report indicating the detected anomalies at operation 618.

Figure 7:
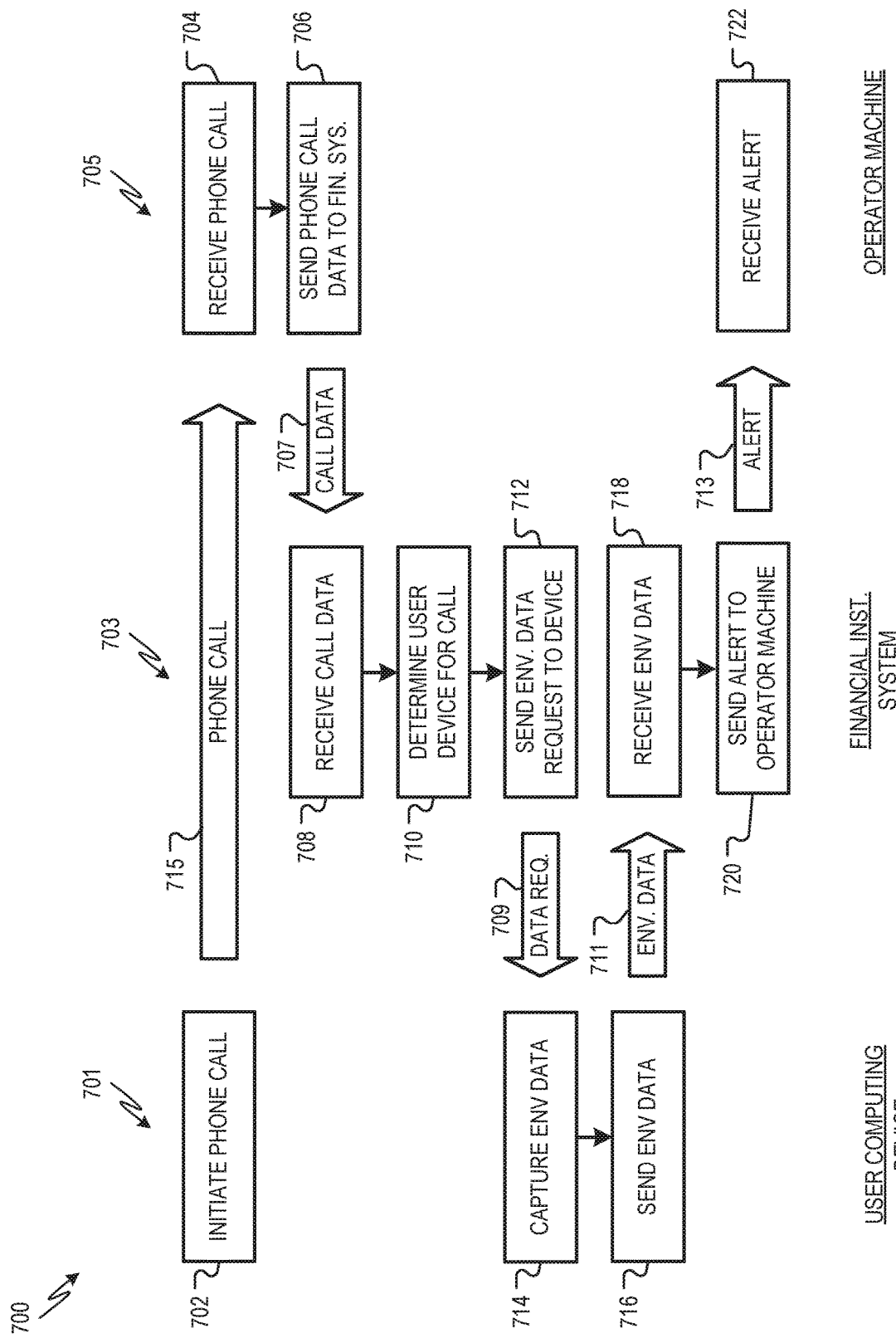
FIG. 7 is a flowchart showing one example of a process flow that may be executed in the environment of FIG. 1 to implement a fraud prevention tool when the user requests a transaction by telephone.

FIG. 7 is a flowchart showing one example of a process flow 700 that may be executed in the environment 100 to implement a fraud prevention tool when the user 106 requests a transaction by telephone. The process flow 700 includes three columns 701, 703, 705. Column 701 includes operations that may be executed by the user computing device 102, Column 703 includes operations that may be executed by the financial institution system 104. Column 705 includes operations that may be executed by an operator device 116, 118.

At operation 702, the user 106 may initiate a phone call 715 to the operator 114. In some examples, this is performed using the user computing device 102 (e.g., the telephone interface 126 thereof). In other examples, operation 702 is executed using another telephone or similar device. The user operator device 116, 118 receives the phone call at operation 704. At operation 706, the operator device 116, 118 sends call data 707 to the financial institution system 104. The call data 707 may describe the phone call 715 including, for example, an identity of the user 106 and data describing one or more transactions requested by the user 106.

The financial institution system 104 receives the call data 707 at operation 708. At operation 710, the financial institution system 104 determines a user computing device 102 associated with the call 715. This may be, for example, the device that made the call and/or a device associated with the user 106 and/or an account of the user 106. At operation 712, the financial institution system 104 sends an environmental data request 709 to the user computing device 102 identified at operation 710. The user computing device 102 receives the request 709 and captures environmental data at operation 714. The user computing device 102 may capture environmental data, for example, by executing the process flow 500 of FIG. 5. At operation 716, the user computing device 102 sends the captured environmental data 711 to the financial institution system 104, which receives the same at operation 718. The environmental data 711 may include raw environmental data and/or (if the user computing device 102 analyzed the environmental data for anomalies) an indication of whether the user computing device 102 detected an anomaly and, if so, a description of the one or more detected anomalies. The financial institution system 104 may analyze the received environmental data for anomalies in addition to or instead of an analysis performed by the user computing device 102.

If an anomaly is detected (by the user computing device 102 and/or the financial institution system 104), the financial institution system 104 may send an alert message 713 to the operator devices 116, 118 at operation 720. The operator device 116, 118 receives the alert message 713 at operation 722. The alert message 713, for example, may be displayed at the operator device 116, 118 and may prompt the operator 114 to ask additional questions of the user 106 and/or decline the requested transaction or transactions.

Figure 8:
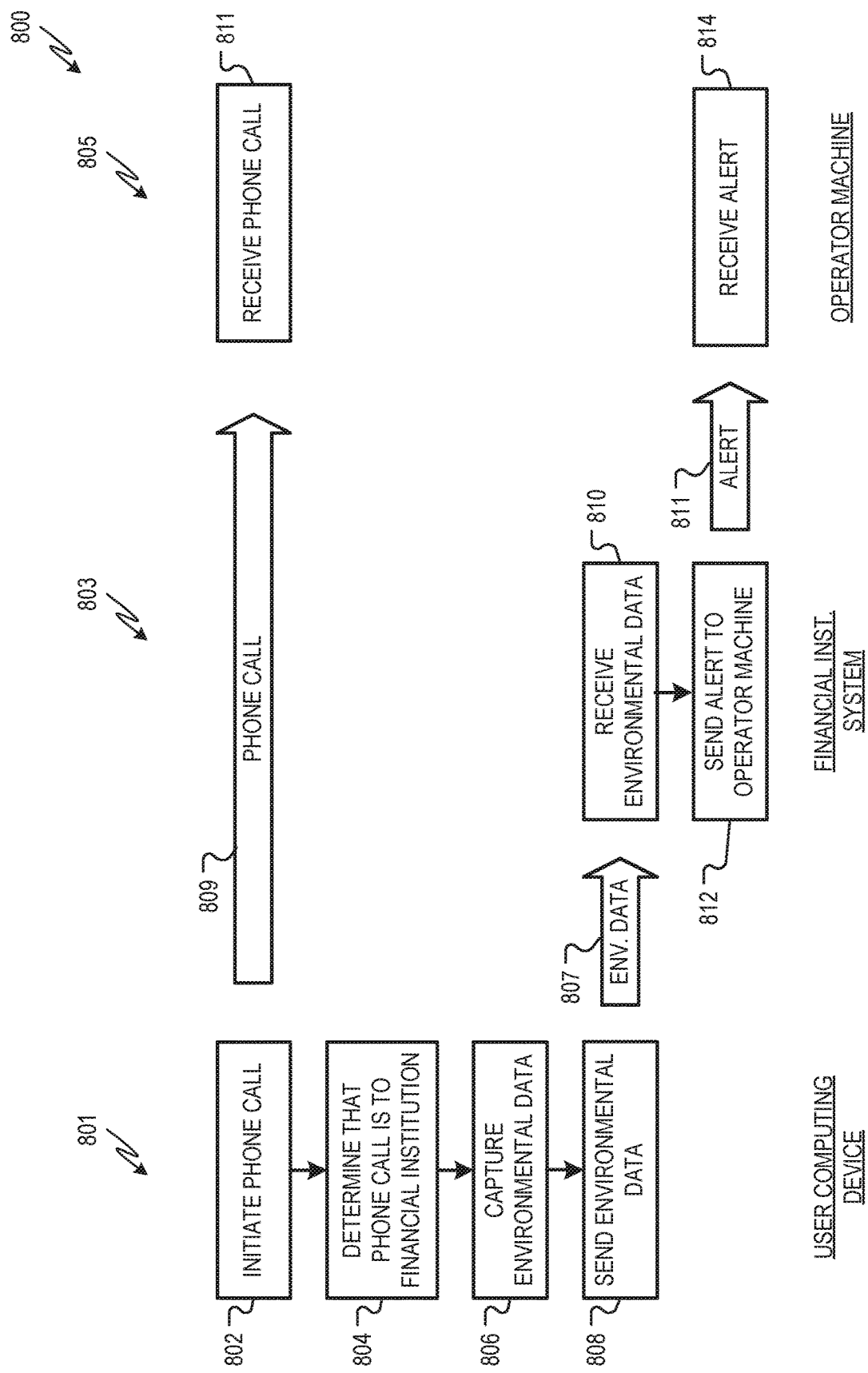
FIG. 8 is a flowchart showing another example process flow that may be executed in the environment of FIG. 1 to implement a fraud prevention tool when the user requests a transaction by telephone.

FIG. 8 is a flowchart showing another example process flow 800 that may be executed in the environment of FIG. 1 to implement a fraud prevention tool when the user requests a transaction by telephone. The process flow 800 includes three columns 801, 803, 805. Column 801 includes operations that may be executed by the user computing device 102. Column 803 includes operations that may be executed by the financial institution system 104. Column 805 includes operations that may be executed by an operator device 116, 118.

At operation 802, the user 106 initiates a phone call 809 to the operator 114. The operator 114 receives the phone call 809 at operation 811, for example, using an operator device 116, 118. At operation 804, the user computing device 102 (e.g., the fraud application 128 thereof) may determine that the phone call 809 is to a financial institution. For example, the user computing device 102 may store and/or otherwise acquire a list of phone numbers associated with the user's financial accounts. The user computing device 102 may determine that the phone call 809 is to the financial institution by matching the called number to the set of numbers associated with the user's financial accounts.

At operation 806, the user computing device 102 may capture environmental data, for example, as described herein with respect to FIG. 5. In some examples, the user computing device 102 also analyzes the environmental data to detect any anomalous conditions. At operation 808, the user computing device 102 sends environmental data 807 to the financial institution system 104, which receives the environmental data 807. In some examples, the environmental data 807 is accompanied by an indication of an anomalous condition detected by the user computing device 102. In some examples, the user computing device 102 provides an indication of anomalous conditions (if any) detected instead of sending the environmental data 807.

The financial institution system 104 receives the environmental data at operation 810. In some examples, the financial institution system 104 analyzes the environmental data to determine if it indicates any anomalous conditions. If anomalous conditions are detected by the financial institution system 104 and/or by the user computing device 102, the financial institution system 104 sends an alert message 811 to the operator device 116, 118 at operation 812. The operator device 116, 118 receives the alert message 811 at operation 814. The alert message 811, for example, may be displayed at the operator device 116, 118 and may prompt the operator 114 to ask additional questions of the user 106 and/or decline the requested transaction or transactions.

Figure 9:
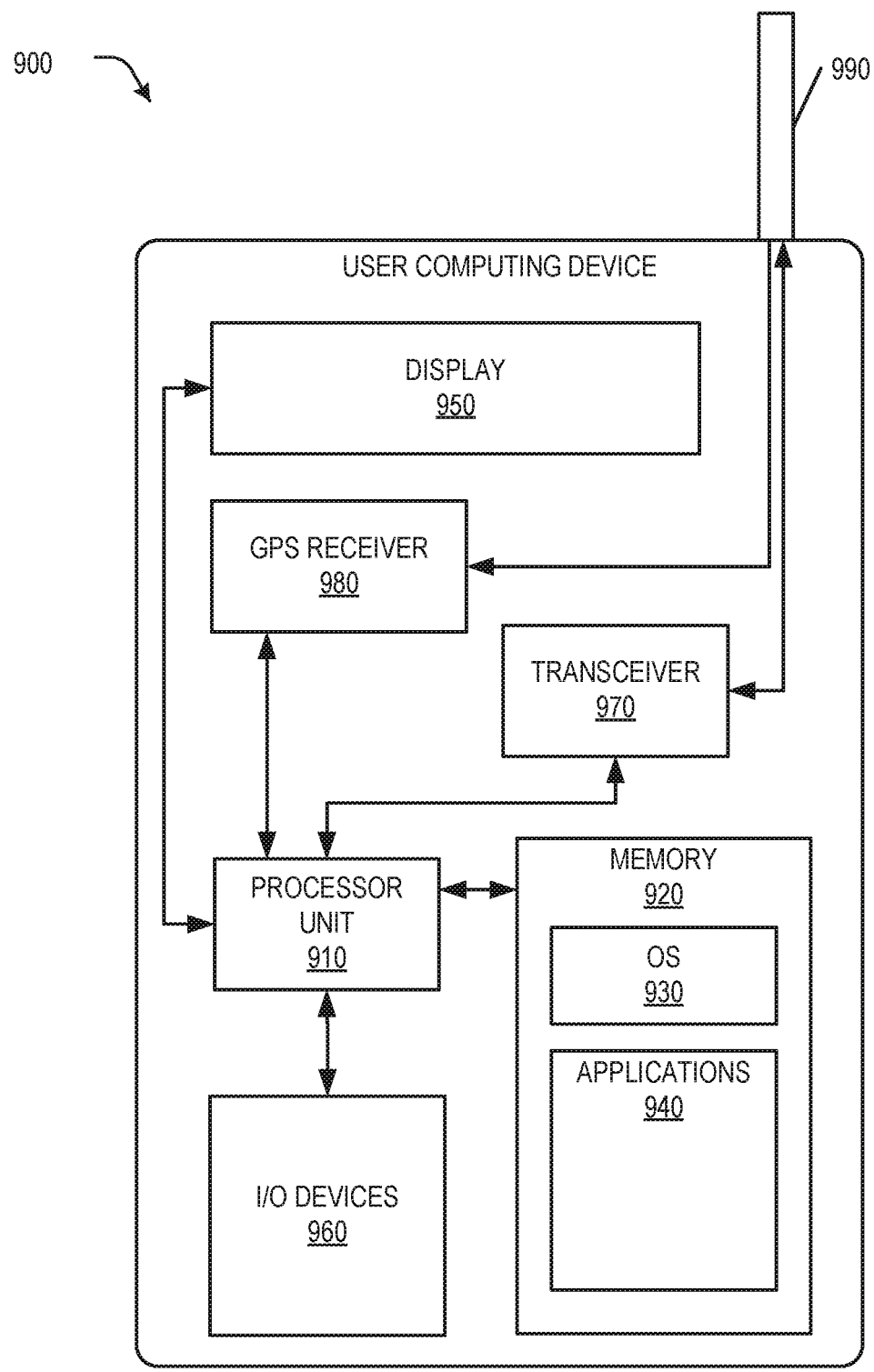
FIG. 9 is a block diagram showing an example architecture of a user computing device.

FIG. 9 is a block diagram showing an example architecture 900 of a user computing device. The architecture 900 may, for example, describe any of the computing devices described herein, including, for example, the user computing device 102, financial institution system 104, merchant device 110, automated teller machine 150, operator devices 116, 118, etc. The architecture 900 comprises a processor unit 910. The processor unit 910 may include one or more processors. Any of a variety of different types of commercially available processors suitable for computing devices may be used (for example, an XScale architecture microprocessor, a Microprocessor without Interlocked Pipeline Stages (ZIPS) architecture processor, or another type of processor). A memory 920, such as a Random Access Memory (RAM), a flash memory, or another type of memory or data storage, is typically accessible to the processor unit 910. The memory 920 may be adapted to store an operating system (OS) 930, as well as application programs 940.

The processor unit 910 may be coupled, either directly or via appropriate intermediary hardware, to a display 950 and to one or more input/output (I/O) devices 960, such as a keypad, a touch panel sensor, a microphone, and the like. Such I/O devices 960 may include a touch sensor for capturing fingerprint data, a camera for capturing one or more images of the user, a retinal scanner, or any other suitable devices. The I/O devices 960 may be used to implement I/O channels, as described herein. In some examples, the I/O devices 960 may also include sensors.

Similarly, in some examples, the processor unit 910 may be coupled to a transceiver 970 that interfaces with an antenna 990. The transceiver 970 may be configured to both transmit and receive cellular network signals, wireless data signals, or other types of signals via the antenna 990, depending on the nature of the computing device implemented by the architecture 900. Although one transceiver 970 is shown, in some examples, the architecture 900 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 980 may also make use of the antenna 990 to receive GPS signals. In addition to or instead of the GPS receiver 980, any suitable location-determining sensor may be included and/or used, including, for example, a Wi-Fi positioning system. In some examples, the architecture 900 (e.g., the processor unit 910) may also support a hardware interrupt. In response to a hardware interrupt, the processor unit 910 may pause its processing and execute an interrupt service routine (ISR).

Figure 10:
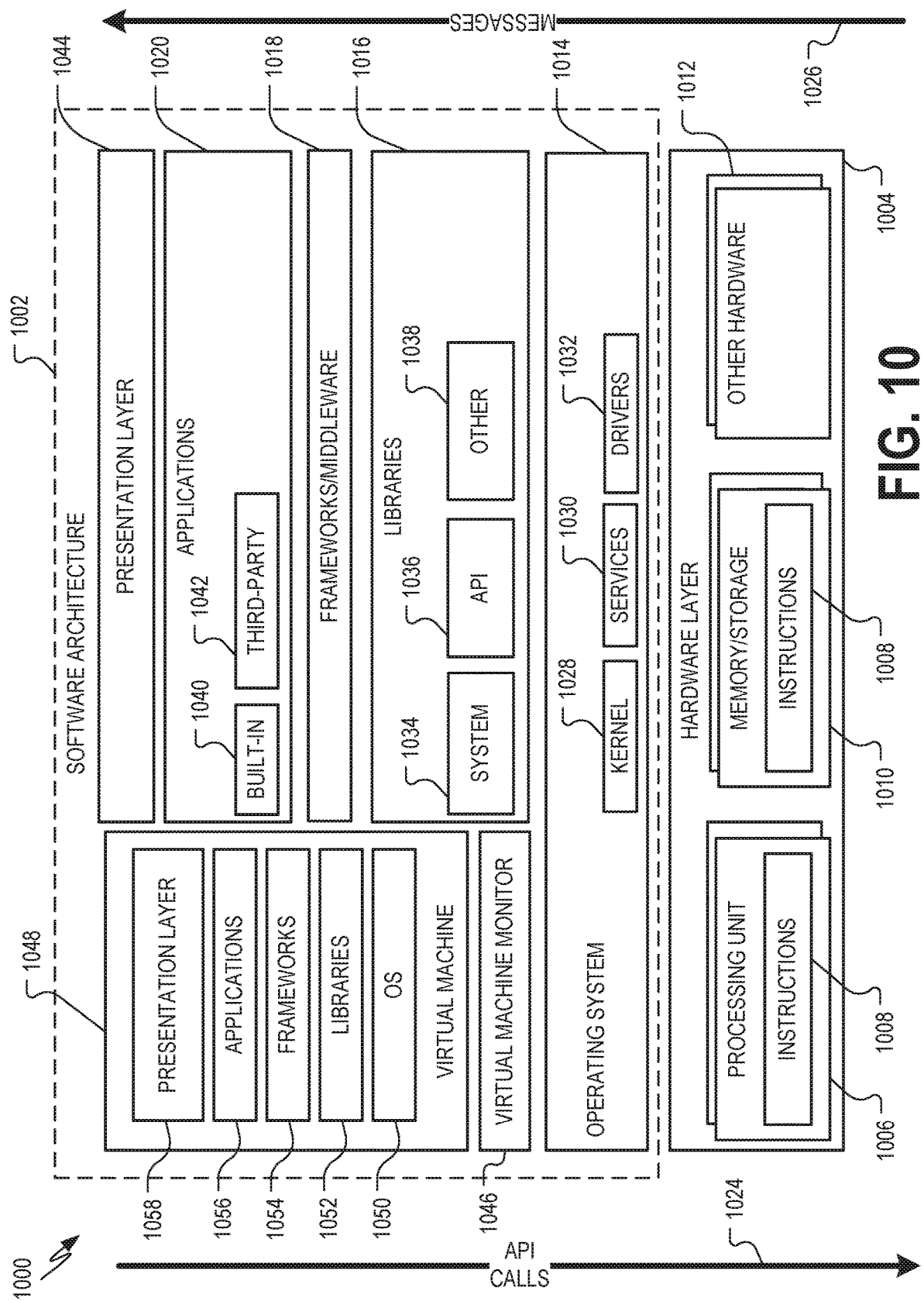
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein, FIG. 10 is merely a non-limiting example of a software architecture 1002, and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11 and/or the architecture 900 of FIG. 9.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-9. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the architecture 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an Interrupt Service Routine (ISR) when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MREG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) nay provide a higher-level common infrastructure that may be utilized by the applications 1020 and/or other software components/modules. For example, the frameworks 1018 may provide various graphical user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042, Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may utilize built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
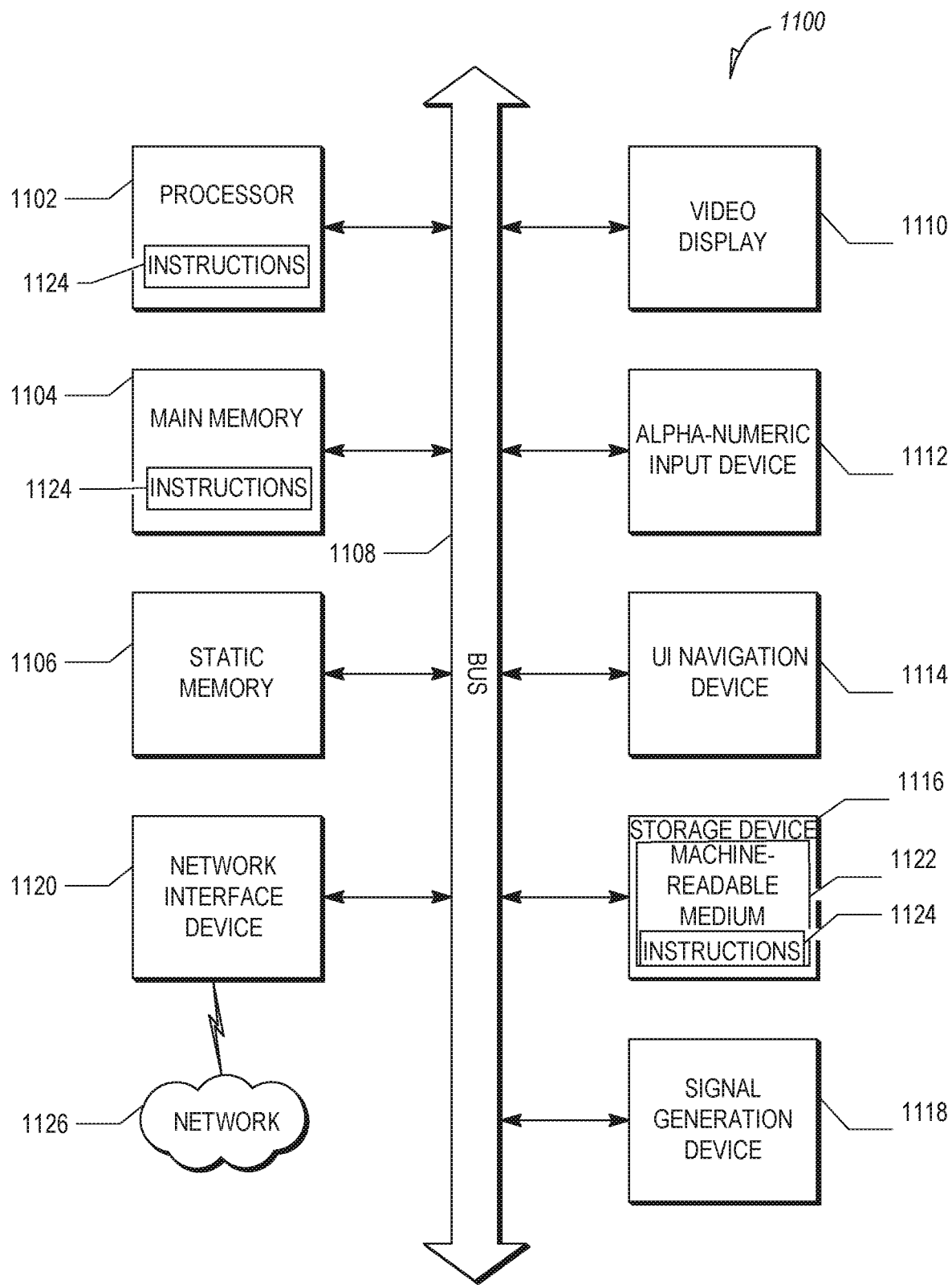
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The architecture 1100 may describe, for example, any of the computing devices and/or control circuits described herein. The architecture 1100 may execute the software architecture 1002 described with respect to FIG. 10. The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., a bus). The architecture 1100 can further include a video display unit 1110, an alphanumeric input device 1112 (e.g., a keyboard), and a UI navigation device 1114 (e.g., a mouse). In some examples, the video display unit 1110, alphanumeric input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a GPS sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or utilized by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media. The instructions 1124 stored at the machine-readable medium 1122 may include, for example, instructions for implementing the software architecture 1002, instructions for executing any of the features described herein, etc.

While the machine-readable medium 1122 is illustrated in an example to be a single medium, the term "machine-readable medium" can include a single medium or multiple media (e.g., a centralized or distributed database, and/or associated caches and servers) that store the one or more instructions 1124. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1124 can further be transmitted or received over a communications network 1126 using a transmission medium via the network interface device 1120 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A financial institution system, comprising:
   at least one processor programmed to perform operations comprising:
   receiving, from an operator device, an indication that the operator device has received a phone call from a user and a description of a first transaction requested by the user in the phone call;
   determining an address for a user computing device associated with the user;
   sending an environmental data request to the user computing device;
   receiving, from the user computing device, environmental data describing an environment of the user;
   determining that the environmental data indicates an anomalous condition; and
   sending an alert to the operator device indicating that the environmental data indicates the anomalous condition.

2. The financial institution system of claim 1, wherein the environmental data comprises an indication of at least one anomalous condition.

3. The financial institution system of claim 1, the operations further comprising, before sending the environmental data request, determining that the first transaction requested by the user in the phone call is inconsistent with historical transaction data for the user.

4. The financial institution system of claim 1, wherein the environmental data comprises biometric data, and wherein the determining that the environmental data indicates the anomalous condition comprises comparing the biometric data to baseline biometric data.

5. The financial institution system of claim 4, wherein the biometric data comprises current heart rate data for the user, the operations further comprising comparing the current heart rate data for the user to baseline heartrate data for the user.

6. The financial institution system of claim 4, wherein the environmental data comprises image data depicting a face, and wherein the determining that the environmental data indicates an anomalous condition is based at least in part on the image data.

7. The financial institution system of claim 4, wherein the environmental data comprises audio data, and wherein the determining that the environmental data indicates an anomalous condition comprises:
   detecting a voice of the user in the audio data;
   detecting a second voice in the audio data; and
   determining that the second voice is not one of a set of trusted voices for the user.

8. The financial institution system of claim 1, the operations further comprising:
   determining that the first transaction is inconsistent with historical transaction data; and
   before receiving the environmental data, sending to the user computing device a request for the environmental data.

9. A computer-implemented method for detecting fraud, comprising:
   receiving, by a financial institution system and from an operator device, an indication that the operator device has received a phone call from a user and a description of a first transaction requested by the user in the phone call;
   determining, by the financial institution system, an address for a user computing device associated with the user;
   sending, by the financial institution system, an environmental data request to the user computing device;
   receiving, by the financial institution system and from the user computing device, environmental data describing an environment of the user;
   determining, by the financial institution system, that the environmental data indicates an anomalous condition; and
   sending, by the financial institution system, an alert to the operator device indicating that the environmental data indicates the anomalous condition.

10. The computer-implemented method of claim 9, further comprising detecting, by the financial institution system, at least one anomalous condition indicated by the environmental data.

11. The computer-implemented method of claim 9, further comprising, before sending the environmental data request, determining, by the financial institution system, that the first transaction requested b the user in the phone call is inconsistent with historical transaction data for the user.

12. The computer-implemented method of claim 9, wherein the environmental data comprises biometric data, and wherein the determining that the environmental data indicates the anomalous condition comprises comparing the biometric data to baseline biometric data.

13. The computer-implemented method of claim 12, wherein the biometric data comprises current heart rate data for the user, further comprising comparing the current heart rate data for the user to baseline heartrate data for the user.

14. The computer-implemented method of claim 12, wherein the environmental data comprises image data depicting a face; and wherein the determining that the environmental data indicates an anomalous condition is based at least in part on the image data.

15. The computer-implemented method of claim 12, wherein the environmental data comprises audio data, and wherein the determining that the environmental data indicates an anomalous condition comprises:
  detecting a voice of the user in the audio data;
  detecting a second voice in the audio data; and
  determining that the second voice is not one of a set of trusted voices for the user.

16. The computer-implemented method of claim 9, further comprising:
  determining that the first transaction requested by the user in the phone call is inconsistent with historical transaction data; and
  before receiving the environmental data, sending to the user computing device a request for the environmental data.

17. A non-transitory machine-readable medium comprising instructions thereon that, when executed by at least one processor, cause the at least one processor to perform operations comprising:
  receiving, from an operator device, an indication that the operator device has received a phone call from a user and a description of a first transaction requested by the user in the phone call;
  determining an address for a user computing device associated with the user;
  sending an environmental data request to the user computing device;
  receiving, from the user computing device, environmental data describing an environment of the user;
  determining that the environmental data indicates an anomalous condition; and
  sending an alert to the operator device indicating that the environmental data indicates the anomalous condition.

18. The non-transitory machine-readable medium of claim 17, the operations further comprising, before sending the environmental data request, determining that the first transaction requested by user in the phone call is inconsistent with historical transaction data for the user.

19. The non-transitory machine-readable medium of claim 17, wherein the environmental data comprises an indication of at least one anomalous condition.

20. The non-transitory machine-readable medium of claim 17, wherein the environmental data comprises audio data, and wherein the determining that the environmental data indicates an anomalous condition comprises:
  detecting a voice of the user in the audio data;
  detecting a second voice in the audio data; and
  determining that the second voice is not one of a set of trusted voices for the user.

* * * * *

UNITED STATES PATENT AND TRADEMARK OFFICE
CERTIFICATE OF CORRECTION

| | | |
|---|---|---|
| PATENT NO. | : 11,847,656 B1 | Page 1 of 1 |
| APPLICATION NO. | : 18/068119 | |
| DATED | : December 19, 2023 | |
| INVENTOR(S) | : Leavitt et al. | |

It is certified that error appears in the above-identified patent and that said Letters Patent is hereby corrected as shown below:

On the Title Page

On page 3, in Column 1, item (56) under "Other Publications", Line 9, delete "Jul. 10," and insert --Jun. 10,-- therefor In the Claims In Column 16, Line 63, in Claim 11, delete "b" and insert --by-- therefor In Column 17, Line 9, in Claim 14, delete "face;" and insert --face,-- therefor In Column 18, Line 18, in Claim 18, after "by", insert --the--

Signed and Sealed this
Thirteenth Day of February, 2024

*Katherine Kelly Vidal*

Katherine Kelly Vidal
*Director of the United States Patent and Trademark Office*